Dec. 31, 1946.   H. S. BLOCH   2,413,310
PROCESS FOR THE RECOVERY OF HYDROCARBONS FROM A SLUDGE
Filed March 31, 1943
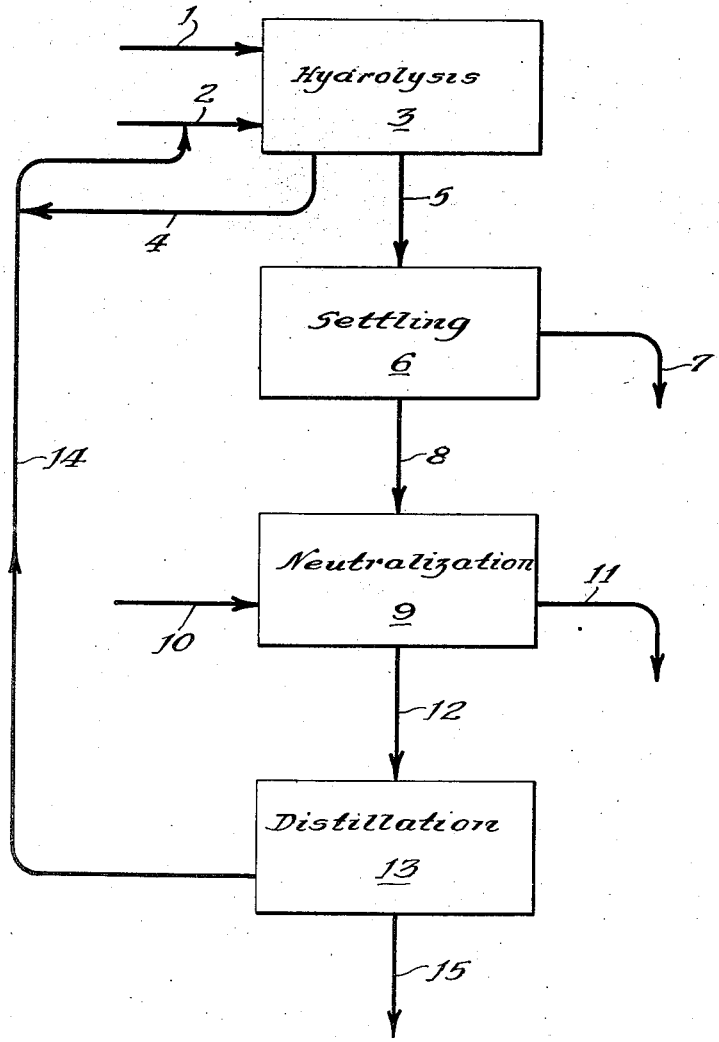
Inventor:
Herman S. Bloch
By: Lee J. Gary
Attorney Patented Dec. 31, 1946

2,413,310

UNITED STATES PATENT OFFICE 2,413,310

PROCESS FOR THE RECOVERY OF HYDRO-CARBONS FROM A SLUDGE

Herman S. Bloch, Riverside, Ill., assignor to Universal Oil Products Company, Chicago, Ill., a corporation of Delaware Application March 31, 1943, Serial No. 481,282

4 Claims. (Cl. 196—148)

This invention relates to a process for decomposing hydrocarbon-containing sludges or complexes to recover therefrom bound organic material.

An object of the invention is the recovery of drying oil materials from sludges containing organically bound aluminum chloride, hydrogen fluoride, sulfuric acid or similar refining agents.

Another object of the invention is to prevent or diminish undesirable polymerization reactions during the hydrolysis of catalyst sludges or other hydrolytic reactions wherein one or more of the hydrolysis products is capable of undergoing undesirable polymerization or other reactions.

As used in this specification the term "hydrolysis" has been extended to include the treatment of a hydrocarbon complex containing either acid or a salt, such as a metallic halide, with an aqueous medium to effect separation of a hydrocarbon layer from the aqueous medium. The term also includes the treatment of alkyl esters with an aqueous medium to recover alcohols, ethers or hydrocarbons therefrom.

Still another object of the invention comprises a means of influencing hydrolysis of alkyl esters in a given direction to recover alcohols, ethers or hydrocarbons therefrom.

Broadly, my invention comprises the controlled hydrolysis of organic-inorganic complexes in the presence of an inert diluent.

More specifically, my invention comprises the controlled hydrolysis of hydrocarbon complexes or sludges in the presence of an inert hydrocarbon diluent to produce oils useful as drying oils.

In one embodiment the present invention relates to a process which comprises subjecting a sludge containing organic bound material to hydrolysis in the presence of one or more low boiling hydrocarbons, refluxing the polyphase mixture under conditions such that the temperature is maintained at a substantially constant level, allowing the mixture to settle, separating the hydrocarbon layer containing the previously bound organic material from the aqueous layer, separating the lower boiling hydrocarbon from the previously bound organic material and recovering the organic material as a product of the process.

The aqueous hydrolyzing medium may consist of water alone or water to which acid, alkali or salts have been added. The choice of low boiling hydrocarbon will depend upon the nature of the material being treated. The hydrocarbon may be butane or pentane if very low hydrolysis temperatures are desired; or it may be a naphtha fraction boiling as high as about 200° C. The boiling point may be varied further by adjusting the pressure of the system.

The principal considerations to be followed in selecting the hydrocarbon used are that it be a hydrocarbon substantially inert under the conditions used in the process, that it be easily separable from the products of hydrolysis and that its boiling point be at the desired temperature of hydrolysis.

The amount of diluent used will vary considerably depending on several factors, including the source and nature of the sludge, the particular diluent used, the temperature and pressure at which the process is operated, and the desired character of the product to be recovered. The character of the product will vary for any given diluent depending on the temperature used during hydrolysis. The exact selection of diluent can not be described in detail since it is partly a matter of experiment. In general, however, by the use of low molecular weight diluents, such as butanes or pentanes, oils of lighter color and higher degrees of unsaturation can be recovered than when, for example, octane or a fraction of straight run gasoline is used.

As the hydrolysis is an exothermic reaction, the heat that is liberated serves to effect additional polymerization of the hydrocarbons present, thus reducing the degree of unsaturation of the product and often producing materials of such high molecular weight, as well as other undesirable properties, that the material is greatly reduced in value.

I have found that it is undesirable to have additional polymerization occur during the hydrolysis operation and that by following the process of my invention, the exothermic heat of hydrolysis is dissipated before any undesirable polymerization can occur.

I have also found that by conducting the hydrolysis reaction in the absence of air or other oxygen-containing gas the product recovered is of superior quality, having improved color characteristics and drying oil properties. The amount of inert hydrocarbon diluent added is also of importance in controlling the viscosity of the drying oil layer. It has been found that by maintaining a sufficient quantity of diluent in the mixture to allow for refluxing, the viscosity of the oil is decreased and the efficiency of contact between the sludge and hydrolyzing medium increased. The decreased viscosity also results in more complete separation of the hydrocarbon oil layer from the aqueous layer in a subsequent operation.

In order to demonstrate more clearly the features of my invention, the accompanying drawing illustrates one form of operation which may be employed. The invention is not limited to the type of system shown, however, as either a batch or continuous type operation may be employed.

Referring now to the drawing a sludge is introduced through line 1 to hydrolyzing zone 3 wherein the sludge is treated with water or other hydrolyzing medium in the presence of a low boiling hydrocarbon or mixture of hydrocarbons. The hydrolyzing medium and diluent are admitted to the system through line 2.

The poly-phase mixture in reaction zone 3 is agitated under conditions such that the low boiling hydrocarbon is refluxed, whereby the heat of hydrolysis of the sludge is dissipated as the heat of vaporization of the low boiling diluent and the temperature is maintained at substantially the boiling point of the latter. Any low boiling diluent which escapes may be recycled to the process through line 4.

After hydrolysis is substantially completed, the mixture is removed through line 5 to settling zone 6 from which the aqueous layer is withdrawn through line 7 while the diluent layer, which contains in solution the previously bound organic material, is passed through line 8 to neutralizing zone 9. An alkaline reagent is admitted to zone 9 through line 10, said reagent reacting with any free acid or metallic halide present in the mixture. Any excess alkaline reagent may be removed through line 11. The neutralized mixture is then withdrawn through line 12 to zone 13 wherein the low boiling diluent may be separated from the previously bound organic material by distillation at substantially atmospheric pressure or at reduced pressure and the diluent returned through line 14 for further use in the process. The desired organic material is drawn off through line 15 and removed from the system.

Although the description has been limited to hydrolysis with a hydrocarbon-water solution, the invention includes the use of low boiling non-hydrocarbon additives to the aqueous medium, such as alcohols, ethers, ketones, chlorinated hydrocarbons, etc., even those which are somewhat soluble in water and which would be distributed between the aqueous layer and that of the liberated organic material.

In the hydrolysis of esters to produce alcohols, the problem of the formation of excess ether or olefin, instead of alcohol, often occurs. This undesirable production of ethers or olefins can be avoided by the use of the inert hydrocarbon diluent as described in the foregoing specification to remove heat of hydrolysis evolved during the preparation of the alcohol, thus resulting in an increased yield of alcohol. On the other hand, the hydrolysis can be controlled by similar means to furnish ethers to the exclusion of alcohols or olefins. It is evident that the reaction can be thus influenced in a given direction by the process of my invention, through the proper choice of diluent and reaction conditions.

I claim as my invention:

1. A process for the recovery of hydrocarbons from a sludge formed by the treatment of hydrocarbons with a metallic halide catalyst which comprises commingling said sludge with an aqueous hydrolyzing medium and a low boiling substantially inert hydrocarbon liquid, hydrolyzing said sludge with said hydrolyzing medium, refluxing said hydrocarbon liquid during the hydrolyzing step to dissipate the exothermic heat of hydrolysis as the heat of vaporization of said liquid and to maintain the hydrolysis temperature at substantially the boiling point of said liquid, and recovering from the reaction mixture hydrocarbons liberated from said sludge by the hydrolysis thereof.

2. A process for the recovery of hydrocarbons from a sludge formed by the treatment of hydrocarbons with an aluminum chloride catalyst which comprises commingling said sludge with an aqueous hydrolyzing medium and a low boiling substantially inert hydrocarbon liquid, hydrolyzing said sludge with said hydrolyzing medium, refluxing said hydrocarbon liquid during the hydrolyzing step to dissipate the exothermic heat of hydrolysis as the heat of vaporization of said liquid and to maintain the hydrolysis temperature at substantially the boiling point of said liquid, and recovering from the reaction mixture hydrocarbons liberated from said sludge by the hydrolysis thereof.

3. A process for the recovery of hydrocarbons from a sludge formed by the treatment of hydrocarbons with a hydrogen fluoride catalyst which comprises commingling said sludge with an aqueous hydrolyzing medium and a low boiling substantially inert hydrocarbon liquid, hydrolyzing said sludge with said hydrolyzing medium, refluxing said hydrocarbon liquid during the hydrolyzing step to dissipate the exothermic heat of hydrolysis as the heat of vaporization of said liquid and to maintain the hydrolysis temperature at substantially the boiling point of said liquid, and recovering from the reaction mixture hydrocarbons liberated from said sludge by the hydrolysis thereof.

4. A process for the recovery of hydrocarbons from a sludge formed by the treatment of hydrocarbons with a catalyst comprising an acid-acting halide selected from the group consisting of aluminum chloride and hydrogen fluoride, which comprises commingling said sludge with an aqueous hydrolyzing medium and a low boiling substantially inert hydrocarbon liquid, hydrolyzing said sludge with said hydrolyzing medium, refluxing said hydrocarbon liquid during the hydrolyzing step to dissipate the exothermic heat of hydrolysis as the heat of vaporization of said liquid and to maintain the hydrolysis temperature at substantially the boiling point of said liquid, and recovering from the reaction mixture hydrocarbons liberated from said sludge by the hydrolysis thereof.

HERMAN S. BLOCH.